US012109527B2

(12) United States Patent
Hernandez et al.

(10) Patent No.: US 12,109,527 B2
(45) Date of Patent: Oct. 8, 2024

(54) PROCESS AND APPARATUS FOR THE SEPARATION OF TWO GASEOUS STREAMS EACH CONTAINING CARBON MONOXIDE, HYDROGEN AND AT LEAST ONE ACID GAS

(71) Applicant: L'Air Liquide, Société Anonyme pour l'Etude et l'Exploitation des Procédés Georges Claude, Paris (FR)

(72) Inventors: Antoine Hernandez, Saint Maur des Fossés (FR); Wei Guan, Shanghai (CN)

(73) Assignee: L'Air Liquide, Societe Anonyme Pour l'Etude et l'Exploitation des Procedes Georges Claude, Paris (FR)

( * ) Notice: Subject to any disclaimer, the term of this patent is extended or adjusted under 35 U.S.C. 154(b) by 381 days.

(21) Appl. No.: 17/615,239

(22) PCT Filed: May 30, 2019

(86) PCT No.: PCT/CN2019/089245
§ 371 (c)(1),
(2) Date: Nov. 30, 2021

(87) PCT Pub. No.: WO2020/237563
PCT Pub. Date: Dec. 3, 2020

(65) Prior Publication Data
US 2022/0233994 A1    Jul. 28, 2022

(51) Int. Cl.
*B01D 53/22*       (2006.01)
*B01D 53/00*       (2006.01)
(Continued)

(52) U.S. Cl.
CPC ....... *B01D 53/0462* (2013.01); *B01D 53/002* (2013.01); *B01D 53/047* (2013.01);
(Continued)

(58) Field of Classification Search
CPC .............. B01D 53/0462; B01D 53/047; B01D 2256/20; B01D 2257/504; B01D 53/1475;
(Continued)

(56) References Cited

U.S. PATENT DOCUMENTS 5,980,858 A * 11/1999 Fujimura ................. C10K 3/04
                                                        48/DIG. 2
6,114,400 A *  9/2000 Nataraj ..................... C01B 3/36
                                                         518/703
(Continued)

FOREIGN PATENT DOCUMENTS

CN      102250658      11/2011
CN      102285651      12/2011
(Continued)

OTHER PUBLICATIONS

European Search Report and Written Opinion for corresponding EP 19930619, Dec. 8, 2022.
(Continued)

*Primary Examiner* — Anthony R Shumate
(74) *Attorney, Agent, or Firm* — Elwood L. Haynes

(57) ABSTRACT

A process for separating two gaseous streams, including purifying a first gaseous stream in a first acid gas removal absorber, purifying in a first temperature swing adsorption unit, and then separating at a cryogenic temperature in a separation unit to produce a stream of fluid enriched in carbon monoxide and a stream of fluid enriched in hydrogen, sending a second gaseous stream containing at least carbon monoxide, hydrogen and at least one acid gas to a shift reaction unit, the shifted second stream is purified in a second acid gas removal absorber to remove carbon dioxide and the purified second stream is sent as a feed stream to a pressure swing adsorption unit to produce a hydrogen enriched stream, and sending at least part of the stream enriched in hydrogen from the separation unit as a feed
(Continued)

stream to the pressure swing adsorption unit to produce the hydrogen-enriched stream.

13 Claims, 2 Drawing Sheets

(51) Int. Cl.
    *B01D 53/04*     (2006.01)
    *B01D 53/047*     (2006.01)
    *B01D 53/14*     (2006.01)
    *C01B 3/12*     (2006.01)
    *C01B 3/50*     (2006.01)
    *C01B 3/56*     (2006.01)

(52) U.S. Cl.
    CPC .......... *B01D 53/1475* (2013.01); *C01B 3/12* (2013.01); *C01B 3/506* (2013.01); *C01B 3/56* (2013.01); *B01D 2256/16* (2013.01); *B01D 2256/20* (2013.01); *B01D 2257/504* (2013.01); *C01B 2203/0283* (2013.01); *C01B 2203/042* (2013.01); *C01B 2203/046* (2013.01)

(58) Field of Classification Search
    CPC .............. B01D 2256/16; B01D 53/002; C01B 2203/046; C01B 2203/0283; C01B 2203/042; C01B 3/506; C01B 3/56; C01B 3/12
    See application file for complete search history.

(56) References Cited

U.S. PATENT DOCUMENTS

| | | | |
|---|---|---|---|
| 8,487,010 B1* | 7/2013 | Thomas | C25B 15/08 518/700 |
| 2002/0142198 A1* | 10/2002 | Towler | H01M 8/0612 429/513 |
| 2010/0011955 A1* | 1/2010 | Hufton | B01D 53/047 96/140 |
| 2011/0097260 A1* | 4/2011 | Vauk | C01B 3/52 423/658.2 |
| 2012/0085079 A1* | 4/2012 | Kaminsky | E21B 43/006 60/39.12 |
| 2012/0241678 A1* | 9/2012 | Valentin | C01B 3/48 252/373 |
| 2013/0047665 A1 | 2/2013 | Genkin et al. | |
| 2014/0005284 A1* | 1/2014 | Thomas | C07C 9/04 518/704 |
| 2014/0186258 A1* | 7/2014 | Allidieres | C01B 3/48 422/162 |
| 2015/0152030 A1 | 6/2015 | Trott | |
| 2015/0175916 A1 | 6/2015 | Klein et al. | |
| 2017/0190574 A1* | 7/2017 | Ercan | B01D 53/8615 |
| 2020/0307997 A1* | 10/2020 | Tranier | F25J 3/0223 |
| 2022/0145193 A1* | 5/2022 | Wegerer | C10G 45/64 |

FOREIGN PATENT DOCUMENTS

| | | |
|---|---|---|
| CN | 105948046 | 9/2016 |
| CN | 106621696 | 5/2017 |
| CN | 206381791 | 8/2018 |
| EP | 3 620 431 | 8/2020 |
| JP | 2000 272905 | 10/2000 |

OTHER PUBLICATIONS

Kohl, A et al., Gas purification, 1997, 5$^{th}$ ed., Gulf Publishing Co., Houston, TX, 1215-1223.

International Search Report and Written Opinion for corresponding PCT/CN2019/089245, Feb. 28, 2020.

* cited by examiner

[FIG.1]
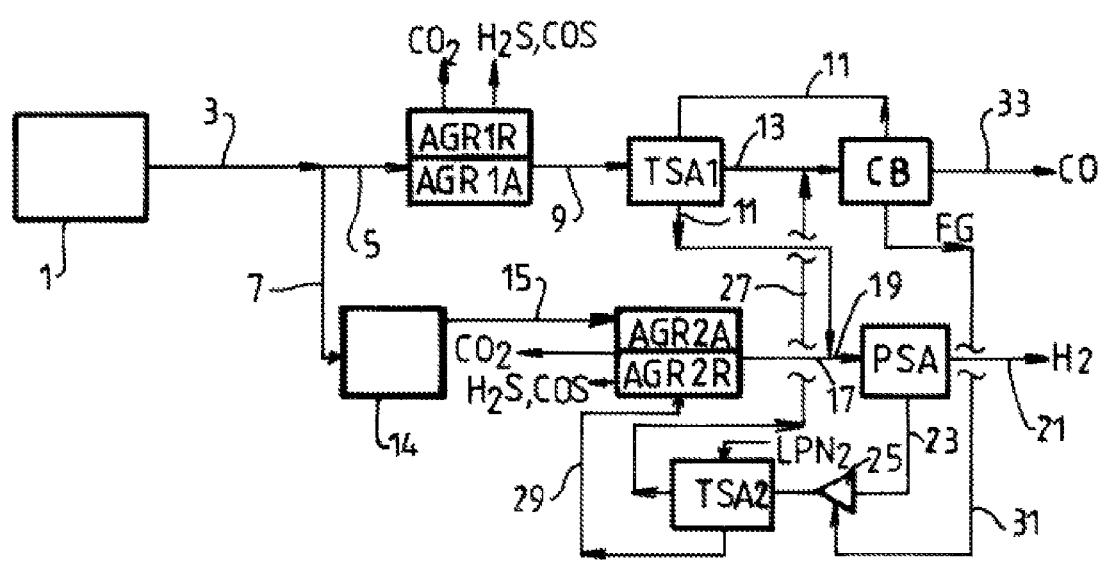

[FIG.2]
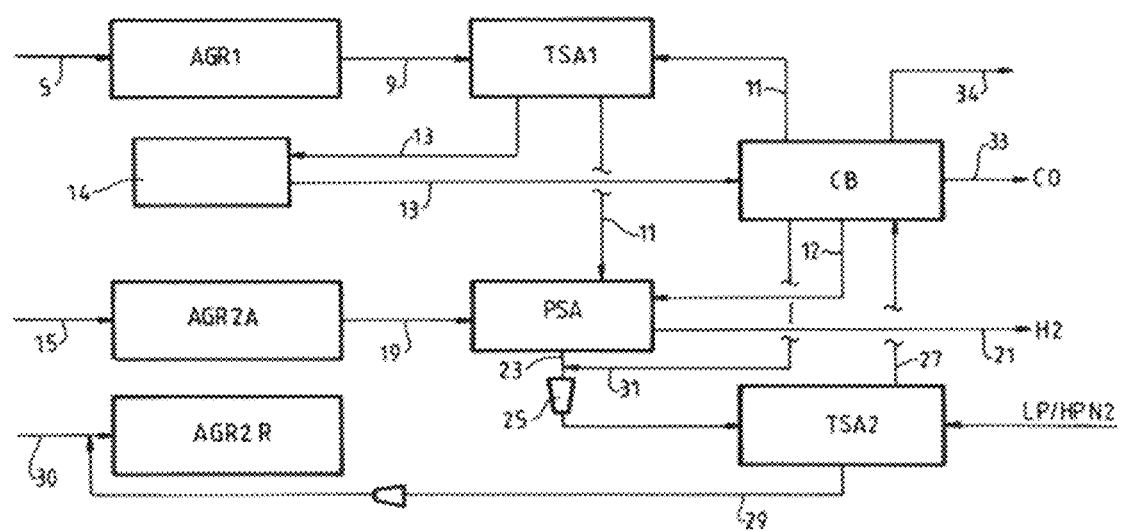

PROCESS AND APPARATUS FOR THE SEPARATION OF TWO GASEOUS STREAMS EACH CONTAINING CARBON MONOXIDE, HYDROGEN AND AT LEAST ONE ACID GAS

CROSS REFERENCE TO RELATED APPLICATIONS

This application is a 371 of International Patent Application No. PCT/CN2019/089245, filed May 30, 2019, the entire contents of which are incorporated herein by reference.

BACKGROUND

The present invention relates to a process and to an apparatus for separating a two gaseous streams, each containing hydrogen, carbon monoxide and at least one acid gas.

The units for producing carbon monoxide and hydrogen may involve two parts:
Generation of the synthesis gas (a mixture essentially containing $H_2$, CO, and possibly at least one of $CH_4$, $CO_2$, Ar and $N_2$). Among the various industrial synthesis gas production processes, that based on coal gasification is becoming more and more widespread especially in countries that are rich in coal deposits such as China. The process of partial oxidation of natural gas may also prove advantageous for the production of CO alone or with low $H_2$/CO production ratios. Another process is steam reforming.
Purification of the synthesis gas. This includes the following:
a scrubbing unit using a liquid solvent to remove most of the acid gases contained in the synthesis gas;
a front end purification (FEP) unit for purification over adsorbent beds in order to remove impurities that would freeze under cryogenic temperatures;
a unit for cryogenic separation, referred to as a cold box, for the production of CO.
a unit for purification over adsorbent beds referred to as a PSA unit for the production of H2.

When the ratio between the H2 product flow and the CO product flow required by downstream consumers is higher than the ratio in the synthesis gas directly produced by the synthesis gas generation, then a shift reactor is added, fed by part of the synthesis gas generated. The remaining synthesis gas which does not feed the shift reactor is sent to the FEP upstream of the cryogenic section or "cold box" for CO production.

When the synthesis gas is produced by a steam methane reformer, the cold box process used is a methane wash; the remaining CO content in the separated H2 rich gas stream is so low that PSA offgas recycle is not required. PSA offgas will then be used as fuel.

When synthesis gas is produced by slurry coal gasification or partial oxidation, then the cold box process used is partial condensation.

The CO content in the H2 rich gas is in this case quite high. In this case, the CO is recovered using PSA offgas recycle in order to increase the economics of the project.

CN105948046 discloses a method for simultaneously preparing pure hydrogen and pure carbon monoxide by gasification without desorbed gas circulation. The synthesis gas prepared by the gasification unit is divided into two parts, one part is used for preparing pure carbon monoxide, and the other part is used to prepare pure hydrogen.

The process of preparing pure carbon monoxide is divided into two parts:
one part prepares pure carbon monoxide with the crude synthesis gas prepared by gasification by a heat recovery unit, a low temperature methanol washing unit, and a cryogenic separation unit,
and the other part is used for preparing pure carbon monoxide by sending the hydrogen rich gas from the outlet of the cold box of the cryogenic separation unit into a PSA-CO unit.
The feedstock for preparing hydrogen is divided into two parts:
one part is the converted gas which is purified by a shift conversion unit and a low temperature methanol washing II unit with the crude synthesis gas prepared by gasification and contains carbon monoxide,
and the other part is the hydrogen rich gas from a TSA device of the cryogenic separation unit, and the two parts of the gas are mixed and sent into the PSA-H2 unit to prepare pure hydrogen.
The method has the disadvantage of using two PSA units, which increases the overall costs.

Another possible scheme where one single PSA is used is when CO is produced together with H2 and synthesis gas for MeOH synthesis. The disadvantage of this solution is that it requires MeOH synthesis investment and so depends on the MeOH market demands.

The invention permits carbon monoxide and hydrogen to be produced using only one pressure swing adsorption unit. This is the preferred solution to reduce total investment compare to a two PSA solution.

SUMMARY

According to one object of the invention, there is provided a process for separating a two gaseous streams each containing at least one acid gas, carbon monoxide and hydrogen to remove carbon monoxide and hydrogen in which:
i) A first gaseous stream containing at least carbon monoxide, hydrogen and at least one acid gas is purified in a first acid gas removal absorber to remove at least one acid gas, purified in a first temperature swing adsorption unit to remove at least carbon dioxide and then separated at a cryogenic temperature in a separation unit to produce a stream of fluid enriched in carbon monoxide and a stream of fluid enriched in hydrogen,
ii) A second gaseous stream containing at least carbon monoxide, hydrogen and at least one acid gas is sent to a shift reaction unit in which carbon monoxide and water vapour in the second stream are converted to carbon dioxide and hydrogen, the shifted second stream is purified in a second acid gas removal absorber to remove carbon dioxide and the purified second stream is sent as a feed stream to a pressure swing adsorption unit to produce a hydrogen enriched stream richer in hydrogen that the feed stream, and
iii) At least part of the stream enriched in hydrogen from the separation unit is also sent as a feed stream to the pressure swing adsorption unit to produce the hydrogen-enriched stream.

According to other optional aspects of the invention:
at least part of the at least part of the stream enriched in hydrogen from the separation unit sent as a feed stream to the pressure swing adsorption unit is previously used to regenerate the first temperature swing adsorption unit.
a gas reduced in hydrogen is produced by the pressure swing adsorption unit and is sent to a second temperature swing adsorption unit where it is purified to remove carbon dioxide and the purified gas from the second temperature swing adsorption unit is sent as a feed gas to the separation unit.

the gas reduced in hydrogen produced by the pressure swing adsorption unit, is compressed by a compressor upstream of the second temperature swing adsorption unit.

the separation unit produces a gas containing hydrogen, carbon monoxide and possibly methane which is sent as a feed stream to the second temperature swing adsorption unit to be separated.

the gas containing hydrogen, carbon monoxide and possibly methane is compressed upstream of the second temperature swing adsorption unit, preferably by the compressor.

gaseous nitrogen is used to regenerate the second temperature swing adsorption unit and after regeneration is sent to the second absorption unit to be used in a stripping process.

the pressure swing adsorption unit is not fed from and/or does not feed any other pressure swing adsorption unit.

the first and/or second gaseous stream contains at least one of the following: carbon dioxide, hydrogen sulphide, nitrogen, methane, carbonyl sulphide.

the process comprising dividing a gaseous mixture containing at least carbon monoxide, hydrogen and at least one acid gas from a generator to form the first and the second streams.

the first and second streams come from different sources the separation at a cryogenic temperature includes at least one partial condensation step and/or at least one distillation step and/or at least one washing step, which may for example be a carbon monoxide or a methane wash.

According to another object of the invention, there is provided an apparatus for separating a mixture containing at least one acid gas, carbon monoxide and hydrogen to remove carbon monoxide and hydrogen comprising:

a first acid gas removal absorber, a first temperature swing adsorption unit, a separation unit, means for sending a first gaseous stream containing at least carbon monoxide, hydrogen and at least one acid gas to be purified in the first acid gas removal absorber to remove at least one acid gas, means to send gas purified in the first acid gas removal absorber to be purified in the first temperature swing adsorption unit to remove at least carbon dioxide and means to send gas purified in at least carbon dioxide from the first temperature swing adsorption unit to be separated at a cryogenic temperature in the separation unit to produce a stream of fluid enriched in carbon monoxide and a stream of fluid enriched in hydrogen, a shift reaction unit, a second acid gas removal absorber, a pressure swing adsorption unit, means for sending a second gaseous stream containing at least carbon monoxide, hydrogen and at least one acid gas is sent to the shift reaction unit in which carbon monoxide and water vapour in the second stream are converted to carbon dioxide and hydrogen, means for sending the shifted second stream to be purified in the second acid gas removal absorber to remove carbon dioxide and means for sending the purified second stream as a feed stream to the pressure swing adsorption unit to produce a hydrogen enriched stream richer in hydrogen that the feed stream, and means for sending at least part of the stream enriched in hydrogen from the separation unit as a feed stream to the pressure swing adsorption unit to produce the hydrogen-enriched stream.

According to other optional aspects of the invention:

the apparatus comprises means for sending at least part of the at least part of the stream enriched in hydrogen from the separation unit as a feed stream to the pressure swing adsorption unit; following use to regenerate the first temperature swing adsorption unit.

the apparatus comprises a second temperature swing adsorption unit, means for sending a gas reduced in hydrogen produced by the pressure swing adsorption unit to the second temperature swing adsorption unit where it is purified to remove carbon dioxide and means for sending the purified gas from the second temperature swing adsorption unit as a feed gas to the separation unit.

the apparatus comprises a compressor and means for sending the gas reduced in hydrogen produced by the pressure swing adsorption unit, to be compressed by the compressor upstream of the second temperature swing adsorption unit.

the separation unit produces a gas containing hydrogen, carbon monoxide and possibly methane which is sent as a feed stream to the second temperature swing adsorption unit to be separated.

The single PSA is fed by H2 rich gas from the cold box as well as pure shifted synthesis gas from acid gas removal absorber.

BRIEF DESCRIPTION OF THE DRAWINGS

For a further understanding of the nature and objects for the present invention, reference should be made to the following detailed description, taken in conjunction with the accompanying drawings, in which like elements are given the same or analogous reference numbers and wherein:

FIG. 1 shows the process according to the invention in block diagram form and

FIG. 2 shows a more detailed version of part of FIG. 1.

DESCRIPTION OF THE PREFERRED EMBODIMENTS

In FIG. 1, a mixture 3 of carbon monoxide, hydrogen and at least one acid gas, such as carbon dioxide and/or hydrogen sulphide is generated by a generator 1, for example by gasification, steam methane reforming or partial oxidation. The mixture generated is divided into a first fraction 5 and a second fraction 7. The mixture may contain other gases, such as nitrogen, methane or other hydrocarbons.

The two fractions 5,7 could potentially have different compositions and originate from different generators.

The first fraction 5 is sent in gaseous form to a first acid gas removal unit AGR1A where it is separated by an absorption process possibly operating at a low temperature, for example using the Rectisol® process. Absorber AGR1 A and reabsorber and stripper AGR1 R form part of the same absorption unit. At least one acid gas such as carbon dioxide and/or hydrogen sulphide and/or carbonyl sulphide is removed from AGR1R and the purified first fraction 5 with a reduced acid gas content is sent to a first temperature swing adsorption unit TSA1. In this unit, any remaining carbon dioxide and methanol are removed and the purified stream 13 produced by the adsorption is sent to a cold box CB.

Upstream of the cold box CB, the stream 13 is cooled, first in the first acid gas removal unit AGR1A and then in a heat exchanger within the cold box. Within the cold box, the stream 13 is separated by distillation and/or scrubbing at a cryogenic temperature, for example using at least one of any of the following: partial condensation, distillation, a methane wash tower, a carbon monoxide wash tower, where fraction 5 contains methane, a nitrogen removal column where fraction 5 contains nitrogen.

The cold box produces a pure carbon monoxide product stream 33, a hydrogen stream 11 and a flash gas stream FG 31 contains carbon monoxide, hydrogen and possibly methane.

The second fraction 7 is sent to a shift unit 14 in which carbon monoxide and water vapour in the second fraction are converted to carbon dioxide and hydrogen. The shifted second fraction 15 is purified in an absorption unit AGR2A for example of the Rectisol® type to remove carbon dioxide and/or hydrogen sulphide and/or carbonyl sulphide. The purified second fraction 17,19 is sent from AGR2A as a feed stream to a pressure swing adsorption unit PSA to produce a hydrogen enriched stream 21 richer in hydrogen than at least one of the feed streams 17,19. Absorber AGR2 A and reabsorber and stripper AGR2 R form part of the same absorption unit Upstream of the pressure swing adsorption unit PSA, the purified second fraction is mixed with hydrogen rich gas 11 from the cold box CB. This hydrogen rich gas may have been used to regenerate the first temperature swing adsorption unit TSA1 and thus contains carbon dioxide adsorbed by the adsorption process.

The offgas 23 from the pressure swing adsorption unit PSA contains less hydrogen than streams 11,19 and is optionally compressed in a compressor 25 before being sent to a second temperature swing adsorption unit TSA2. Within the second temperature swing adsorption unit, carbon dioxide and methanol in the feed stream 23 are removed and the purified stream 27 is sent as a feed stream to the cold box CB.

The second temperature swing adsorption unit TSA2 is regenerated using a low pressure gaseous nitrogen stream LPN2 which may come from a nearby air separation unit. The nitrogen used for the regeneration contains carbon dioxide and Methanol and is sent as stream 29 to the absorption unit AGR2.

The optional compressor 25 may also be used to increase the pressure of the flash gas 31 from the cold box CB, thus mixing gas 31 with the PSA offgas 23 at an intermediate point of the compressor 25.

FIG. 2 shows a more detailed version of part of FIG. 1. In addition to the features already explained above, FIG. 2 shows the warming process for the purified mixture 13 from TSA1 in heat exchanger 14 forming part of the absorption unit AGR1.

In addition, FIG. 2 shows that the nitrogen 29 having been used for the regeneration of second temperature swing adsorption unit TSA2 is compressed and then mixed with nitrogen stream 30. The gaseous nitrogen 29 will also contain methanol and/or carbon dioxide from the second temperature swing adsorption unit TSA2. The combined stream is then used in AGR2 R. in a stripping process.

Absorber AGR2 A and reabsorber and stripper AGR2 R form part of the same absorption unit, serving to remove hydrogen sulphide and carbon dioxide from gas 15. In the absorber AGR2, all undesired gas components are eliminated from gas 15 stage to produce gas 19 having a reduced carbon dioxide and hydrogen sulphide content. Impurity-laden methanol used for the absorption is transferred from the absorber to flashing stages where the hydrogen and carbon monoxide are expelled. These gases are then recycled to the gas 15. A second flashing operation is performed in unit AGR2 R, to regenerate the methanol. The reabsorber removes the sulphur components from the carbon dioxide gas. Nitrogen gas 30 is used for stripping in unit AGR2 R together with nitrogen 29 which has been to regenerate the second temperature swing adsorption unit.

The first acid gas reabsorber and stripper AGR1R and the second acid gas reabsorber and stripper AGR2R may be combined in a single reabsorber and a single stripper.

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

The invention claimed is:

1. A process for separating two gaseous streams each containing at least one acid gas, carbon monoxide and hydrogen to remove carbon monoxide and hydrogen comprising:
   i) purifying a first gaseous stream containing at least carbon monoxide, hydrogen and at least one acid gas in a first acid gas removal absorber to remove at least one acid gas, purifying in a first temperature swing adsorption unit to remove at least carbon dioxide and then separating at a cryogenic temperature in a separation unit to produce a stream of fluid enriched in carbon monoxide and a stream of fluid enriched in hydrogen,
   ii) sending a second gaseous stream containing at least carbon monoxide, hydrogen and at least one acid gas to a shift reaction unit in which carbon monoxide and water vapor in the second stream are converted to carbon dioxide and hydrogen, the shifted second stream is purified in a second acid gas removal absorber to remove carbon dioxide and the purified second stream is sent as a feed to a pressure swing adsorption unit to produce a hydrogen enriched stream richer in hydrogen than the feed stream, and
   iii) sending at least part of the stream enriched in hydrogen from the separation unit to the pressure swing adsorption unit to produce the hydrogen-enriched stream,
      wherein a gas reduced in hydrogen is produced by the pressure swing adsorption unit and is sent to a second temperature swing adsorption unit where it is purified to remove carbon dioxide and the purified gas from the second temperature swing adsorption unit is sent as a feed gas to the separation unit.

2. The process according to claim 1 wherein at least part of the stream enriched in hydrogen from the separation unit sent to the pressure swing adsorption unit is previously used to regenerate the first temperature swing adsorption unit.

3. The process according to claim 1, wherein the gas reduced in hydrogen produced by the pressure swing adsorption unit, is compressed by a compressor upstream of the second temperature swing adsorption unit.

4. The process according to claim 1, wherein the separation unit produces a gas containing hydrogen, carbon monoxide and possibly methane which is sent as a feed to the second temperature swing adsorption unit to be separated.

5. The process according to claim 4 wherein the gas containing hydrogen, carbon monoxide and possibly methane is compressed upstream of the second temperature swing adsorption unit.

6. The process according to claim 1, wherein gaseous nitrogen is used to regenerate the second temperature swing adsorption unit and after regeneration is sent to the second acid gas removal stripper to be used in a stripping process.

7. The process according to claim 1, in which the pressure swing adsorption unit is not fed from and/or does not feed any other pressure swing adsorption unit.

8. The process according to claim 1, wherein the first and/or second gaseous stream contains at least one of the following: carbon dioxide, hydrogen sulphide, nitrogen, methane, carbonyl sulphide.

9. The process according to claim 1, comprising dividing a gaseous mixture containing at least carbon monoxide, hydrogen and at least one acid gas from a generator to form the first and the second streams.

10. An apparatus for separating two gaseous streams, each containing at least one acid gas, carbon monoxide and hydrogen to remove carbon monoxide and hydrogen comprising:

a first acid gas removal absorber, a first temperature swing adsorption unit, a separation unit, a means for sending a first gaseous stream containing at least carbon monoxide, hydrogen and at least one acid gas to be purified in the first acid gas removal absorber to remove at least one acid gas, a means to send gas purified in the first acid gas removal absorber to be purified in the first temperature swing adsorption unit to remove at least carbon dioxide and means to send gas purified in at least carbon dioxide from the first temperature swing adsorption unit to be separated at a cryogenic temperature in the separation unit to produce a stream of fluid enriched in carbon monoxide and a stream of fluid enriched in hydrogen, a shift reaction unit, a second acid gas removal absorber, a pressure swing adsorption unit, a means for sending a second gaseous stream containing at least carbon monoxide, hydrogen and at least one acid gas is sent to the shift reaction unit in which carbon monoxide and water vapour in the second stream are converted to carbon dioxide and hydrogen, a means for sending the shifted second stream to be purified in the second acid gas removal absorber to remove carbon dioxide and a means for sending the purified second stream as a feed stream to the pressure swing adsorption unit to produce a hydrogen enriched stream richer in hydrogen than the feed stream, and a means for sending at least part of the stream enriched in hydrogen from the separation unit to the pressure swing adsorption unit to produce the hydrogen-enriched stream, further comprising a second temperature swing adsorption unit, a means for sending a gas reduced in hydrogen produced by the pressure swing adsorption unit to the second temperature swing adsorption unit where it is purified to remove carbon. dioxide and means for sending the purified gas from the second temperature swing adsorption unit as a feed gas to the separation unit.

11. The apparatus according to claim 10, further comprising a means for sending at least part of the at least part of the stream enriched in hydrogen from the separation unit to the pressure swing adsorption unit following use to regenerate the first temperature swing adsorption unit.

12. The apparatus according to claim 10, further comprising a compressor and a means for sending the gas reduced in hydrogen produced by the pressure swing adsorption unit, to be compressed by the compressor upstream of the second temperature swing adsorption unit.

13. The apparatus according to claim 10, wherein the separation unit produces a gas containing hydrogen, and carbon monoxide which is sent as a feed stream to the second temperature swing adsorption unit to be separated.

* * * * *